United States Patent
Choi et al.

(10) Patent No.: US 10,057,381 B2
(45) Date of Patent: *Aug. 21, 2018

(54) USER TERMINAL, RULE EXECUTING METHOD THEREOF, SERVER APPARATUS AND RULE EXECUTING SYSTEM

(71) Applicant: SAMSUNG ELECTRONICS CO., LTD., Suwon-si (KR)

(72) Inventors: Hyung-tak Choi, Suwon-si (KR); Yu-na Kim, Suwon-si (KR); O-hoon Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,212

(22) Filed: Apr. 19, 2017

(65) Prior Publication Data
US 2017/0223145 A1    Aug. 3, 2017

Related U.S. Application Data

(63) Continuation of application No. 14/721,047, filed on May 26, 2015, now Pat. No. 9,635,139.

(30) Foreign Application Priority Data

May 27, 2014   (KR) .................. 10-2014-0063992

(51) Int. Cl.
*H04L 29/06*   (2006.01)
*G06F 3/0482*   (2013.01)
(Continued)

(52) U.S. Cl.
CPC ............ *H04L 67/42* (2013.01); *G06F 3/0482* (2013.01); *G06F 3/04847* (2013.01);
(Continued)

(58) Field of Classification Search
USPC ......................... 709/203, 217, 223
See application file for complete search history.

(56) References Cited

U.S. PATENT DOCUMENTS

| | | | | |
|---|---|---|---|---|
| 6,601,082 B1 * | 7/2003 | Durham | .................. | H04L 41/28 709/223 |
| 6,636,528 B1 * | 10/2003 | Korpi | ................ | H04L 29/06027 370/466 |

(Continued)

FOREIGN PATENT DOCUMENTS

GB    2 431 072 A    4/2007

OTHER PUBLICATIONS

Communication from the European Patent Office issued Oct. 27, 2015 in a counterpart European Application No. 15168981.7.

*Primary Examiner* — Jude Jean Gilles
(74) *Attorney, Agent, or Firm* — Sughrue Mion, PLLC

(57) ABSTRACT

A user terminal includes an inputter which receives a user command, a display, a communicator configured to communicate with an external server, and a controller configured to create a first rule in which the user terminal performs a first action when a first condition is met in another first user terminal, control the communicator to transmit the created first rule to the external server, and perform the first action according to an event command when the event command to perform the first action is received from the external server upon the first condition being met in the first user terminal.

14 Claims, 13 Drawing Sheets

(51) Int. Cl.
  *H04L 12/24* (2006.01)
  *H04M 1/725* (2006.01)
  *G06F 3/0484* (2013.01)
  *H04L 29/08* (2006.01)
(52) U.S. Cl.
  CPC ............ *H04L 41/22* (2013.01); *H04L 67/303* (2013.01); *H04M 1/72569* (2013.01); *H04M 1/72572* (2013.01)

(56) References Cited

U.S. PATENT DOCUMENTS

| | | | |
|---|---|---|---|
| 9,635,139 B2* | 4/2017 | Choi | H04L 67/42 |
| 2006/0014532 A1 | 1/2006 | Seligmann et al. | |
| 2007/0174447 A1 | 7/2007 | Kim et al. | |
| 2007/0201665 A1 | 8/2007 | Kocan et al. | |
| 2007/0273555 A1* | 11/2007 | Amano | G01C 21/3694 340/935 |
| 2008/0189235 A1* | 8/2008 | Mital | G06F 8/34 706/52 |
| 2009/0006283 A1* | 1/2009 | Labrie | G06F 17/30303 706/12 |
| 2009/0203370 A1 | 8/2009 | Giles et al. | |
| 2009/0318143 A1* | 12/2009 | Kim | H04N 5/50 455/434 |
| 2010/0145479 A1 | 6/2010 | Griffiths | |
| 2010/0161803 A1 | 6/2010 | Tsai et al. | |
| 2010/0169408 A1 | 7/2010 | Tsai et al. | |
| 2011/0075818 A1* | 3/2011 | Vance | G10L 15/07 379/88.01 |
| 2012/0075529 A1* | 3/2012 | Wong | H04N 21/43615 348/552 |
| 2012/0079532 A1* | 3/2012 | Wong | H04N 5/4403 725/37 |
| 2012/0079533 A1* | 3/2012 | Wong | H04N 5/4403 725/37 |
| 2012/0105579 A1* | 5/2012 | Jeon | H04N 5/2258 348/38 |
| 2014/0321721 A1* | 10/2014 | Mitani | G06K 9/00288 382/118 |
| 2015/0043574 A1 | 2/2015 | Akiyoshi et al. | |

* cited by examiner

USER TERMINAL, RULE EXECUTING METHOD THEREOF, SERVER APPARATUS AND RULE EXECUTING SYSTEM

CROSS-REFERENCE TO RELATED APPLICATIONS

This application is a continuation of U.S. application Ser. No. 14/721,047 filed on May 26, 2015, which claims priority from Korean Patent Application No. 10-2014-0063992, filed on May 27, 2014 in the Korean Intellectual Property Office, the disclosures of which are incorporated herein by reference in their entirety.

BACKGROUND

1. Field

Apparatuses and methods consistent with one or more exemplary embodiments relate to a user terminal configured to execute a rule that states that a specific action is performed when a specific condition is met between one or more user terminals, a rule executing method of the user terminal, a server apparatus, and a rule executing system.

2. Description of the Related Art

With the development of electronic technology, various user terminals have been developed and distributed, with increased functions to meet customer's demands.

Specifically, various types of user terminals may provide a function of performing one specific action when a specific condition set by a user is met. For example, a mobile phone user may use an alarm function for providing an alarm sound when the time set by the user elapses. TV users may use a reserved viewing function of reproducing reserved contents at a reserved time without requiring any separate manipulation once the users select specific contents and set a specific time on an electronic program guide (EPG).

However, because such function is based on creating a certain form of rule to execute a specific action when a specific condition is met, each of the terminals has different conditions to meet and different actions to execute, and each terminal system can provide a limited number of conditions and actions. Accordingly, limited rules can be generated and executed.

Accordingly, it is advantageous if a technology could combine one or more conditions with one or more actions between a plurality of user terminals in which the conditions to be met and the actions to be performed are different from each other, or even in one terminal, to create various rules stating that specific action is performed when specific condition is met, and execute the created rules.

SUMMARY

One or more exemplary embodiments overcome the above disadvantages and other disadvantages that may not be described above.

According to an aspect of an exemplary embodiment, there is provided a user terminal including an inputter configured to receive a user command, a communicator configured to communicate with an external server, and a controller configured to, according to the user command, create a first rule in which the user terminal is configured to perform a first action in response to a first condition being met in a first other user terminal, control the communicator to transmit the first rule to the external server, and perform the first action in response to receiving an event command when the event command to perform the first action from the external server.

The controller may be further configured to, in response to receiving profile information from the external server, create the first rule based on the profile information, and the profile information may include at least one of information regarding the first other user terminal, information regarding a first user, and information regarding a condition and an action that the user terminal and the first other user terminal are capable of performing.

The user terminal may further include a display, and the controller may be further configured to display a user interface (UI) for creating the first rule based on the received profile information.

The UI for creating the first rule may include at least one of a list for selecting the first user terminal, a list for selecting the first condition, and a list for selecting the first action.

The controller may be further configured to create the first rule by selecting a rule automatically recommended by the external server or the user terminal.

According to the user command, the controller may be further configured to create a second rule in which a third other user terminal performs a second action in response to a second condition being met in a second other user terminal.

According to a user command, the controller may be further configured to create a third rule in which a fourth other user terminal performs a third action in response to a third condition being met in the user terminal.

According to an aspect of another exemplary embodiment, there is provided a rule executing method of a user terminal including creating a first rule in which the user terminal performs a first action in response to a first condition being met in a first other user terminal according to a user command, transmitting the created first rule to an external server, receiving an event command to perform the first action from the external server in response to the first condition being met in the first other user terminal, and performing the first action according to the event command.

The creating the first rule may include receiving, from the external server, profile information comprising at least one of information regarding the first other user terminal, information regarding a first user, and information regarding a condition and an action that the user terminal and the first user terminal are capable of performing, and creating the first rule based on the received profile information.

The creating the first rule may include displaying a user interface (UI) for creating the first rule based on the received profile information. The first rule may be created through the displayed UI.

The UI for creating the first rule may include at least one of a list for selecting the first user terminal, a list for selecting the first condition, and a list for selecting the first action.

The creating the first rule may create the first rule by selecting a rule automatically recommended by the external server or the user terminal.

The rule executing method may additionally include, according to the user command, creating a second rule in which a third other user terminal performs a second action in response to a second condition being met in a second other user terminal.

The rule executing method may additionally include, according to the user command, creating a third rule in which a fourth other user terminal performs a third action in response to a third condition being met in the user terminal.

According to an aspect of another exemplary embodiment, there is provided a server apparatus including a memory, a communicator configured to communicate with a user terminal, and a controller configured to control the communicator to receive from the user terminal a first rule in which the user terminal is configured to perform a first action in response to a first condition being met in a first other user terminal, and transmit an event command to the user terminal to perform the first action in response to the first condition being met in the first other user terminal.

The controller may be further configured to control the communicator to receive at least one of a second rule, in which a third other user terminal performs a second action in response to a second condition being met in a second other user terminal, and a third rule in which a fourth other user terminal performs a third action in response to a third condition being met in the user terminal from the user terminal, and according to the received rule, transmit an event command to perform the second action to the third other user terminal in response to the second condition being met in the second other user terminal, and transmit an event command to perform the third action to the fourth other user terminal in response to the third condition being met in the user terminal.

In response to the first rule being approved by the first other user terminal and the controller receiving a first condition meeting message from the first other user terminal, the controller may be further configured to control the communicator to transmit an event command to perform the first action to the user terminal.

The memory may include executing record information regarding the first rule, indicating that the information regarding the first rule received from the user terminal and the first condition meeting message are received, and indicating that the event command to perform the first action is transmitted, and the controller may be further configured to create a new rule by using the information stored in the memory, and recommend the created new rule to the user terminal.

The server apparatus may additionally include a plug-in interface configured to add one or more conditions and one or more actions that the user terminal is capable of performing. The controller may be further configured to transmit profile information regarding the one or more conditions and the one or more actions to the user terminal in response to the one or more conditions and the one or more actions that the user terminal is capable of performing being added through the plug-in interface.

According to an aspect of another exemplary embodiment, there is provided a rule executing system including a server, and a first terminal configured to, according to a user command, create a rule in which a third terminal performs a specific action in response to a specific condition being met in a second terminal and transmit the created rule to the server. The server apparatus is configured to receive the rule from the first terminal, and transmits an event command to perform the specific action to the third terminal in response to a specific condition meeting message being received from the second terminal. The second terminal is configured to transmit the specific condition meeting message to the server apparatus in response to the specific condition being met. The third terminal is configured to perform the specific action in response to the event command to perform the specific action being received from the server.

According to an aspect of another exemplary embodiment, there is provided a user terminal including an inputter configured to receive a user command, and a controller configured to, according to the user command, create a rule in which the user terminal performs one or more specific actions in response to one or more specific conditions being met in the user terminal, and perform the one or more specific actions in response to the one or more specific conditions being met in the user terminal.

According to the rule, the one or more specific actions may be sequentially performed in response to the one or more specific conditions being met in the user terminal, and the controller may be configured to perform the one or more specific actions sequentially in response to the one or more specific conditions being met in the user terminal.

According to an aspect of another exemplary embodiment, there is provided a user terminal including an inputter configured to receive a user command, a communicator configured to communicate with a first other user terminal, and a controller configured to, according to the user command, create a first rule in which the user terminal performs a first action in response to a first condition being met in the first other user terminal, control the communicator to transmit the created first rule to the first user terminal, and perform the first action in response to a first condition meeting message being received upon the first condition being met in the first user terminal.

According to one or more exemplary embodiments, a terminal user may combine one or more conditions with one or more actions between a plurality of the user terminals in which the conditions to be met and the actions to be performed are different to each other or even in one terminal, to create various rules in which specific action is performed when specific condition is met, and execute the created rules.

BRIEF DESCRIPTION OF THE DRAWINGS

The above and/or other aspects of the disclosure will be more apparent by describing one or more exemplary embodiments with reference to the accompanying drawings, in which.

DETAILED DESCRIPTION OF EXEMPLARY EMBODIMENTS

Figure 1A:
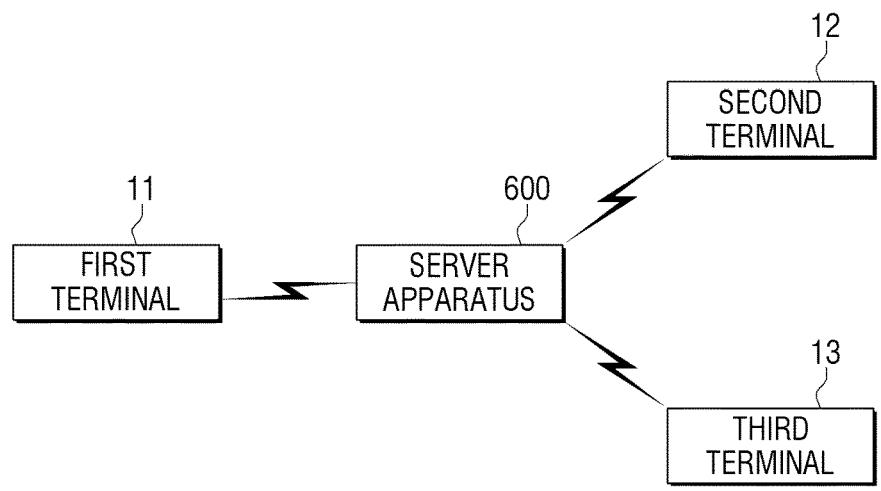
FIGS. 1A and 1B illustrate a rule executing system according to an exemplary embodiment.

One or more exemplary embodiments will now be described with reference to the accompanying drawings.

In the following description, same drawing reference numerals are used for similar elements throughout the drawings. Matters defined in the description, such as detailed construction and elements, are provided to assist in a comprehensive understanding of the disclosure. Accordingly, it will be apparent that one or more exemplary embodiments can be carried out without the specifically defined matters. Also, well-known functions or constructions may not be described in detail if they would obscure the disclosure with unnecessary detail. Expressions such as "at least one of," when preceding a list of elements, modify the entire list of elements and do not modify the individual elements of the list.

Figure 1B:
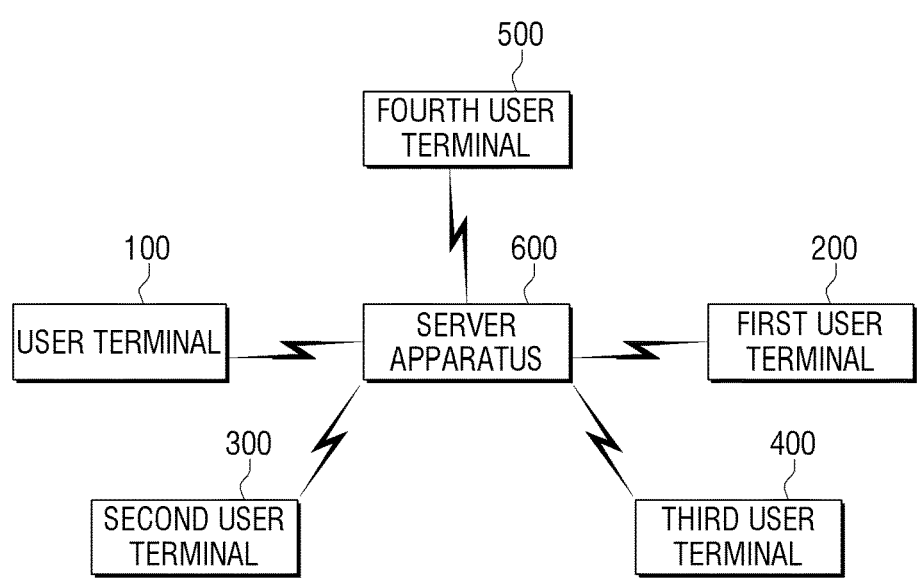

FIGS. 1A and 1B illustrate a rule executing system according to an exemplary embodiment. Referring to FIG. 1A, a rule executing system 10 includes a first terminal 11, a second terminal 12, a third terminal 13 and a server apparatus 600. Herein, the first to the third terminals 11 to 13 may be any of mobile devices, smart TVs, various types of electronic devices, laptops, PCs, or other unlimited types of terminals. Further, the first to the third terminals 11 to 13 may connect to the server apparatus 600 through various communication methods including wired and wireless methods.

Unless otherwise indicated, "rule" indicates one unit for executing, which may include one or more conditions and one or more actions, and which is a rule in such a format that one or more actions are performed when one or more conditions are met, either between a plurality of the user terminals or within one terminal. According to types of the user terminals, conditions that can be met in the terminals and actions that can be performed in the terminals may be different from each other.

When a "rule is executed," it means that a specific action is executed by a specific terminal when a specific condition is met in a specific terminal according to the contents of the rule.

For example, the first terminal 11 may create a rule that states that a specific action is performed by the third terminal 13 when a specific condition is met in the second terminal 12 according to a user command, and transmit the created rule to the server apparatus 600.

The server apparatus 600 may transmit an event command to perform a specific action to the third terminal 13 when the rule is received from the first terminal 11, and a condition meeting message (i.e., a message that confirms that condition is met) is received after the specific condition is met in the second terminal 12.

The second terminal 12 may transmit a specific condition meeting message to the server apparatus 600 when the specific condition is met, and the third terminal 13 may perform the specific action when an event command to perform the specific action is received from the server apparatus 600.

FIG. 1A illustrates an example in which the first terminal 11 is a terminal creating rules, the second terminal 12 is a terminal meeting conditions, and the third terminal 13 is a terminal performing actions. Thus, in this example, the terminal creating rules, the terminal meeting conditions, and the terminal performing actions are different terminals.

However, the creation of rules is not limited to the above example. For example, rules can be created in which the terminal creating rules also the terminal meeting conditions, or in which the terminal creating rules is also the terminal performing actions.

Below, various cases of rules and operations of the rule executing system 20 according to various rules will be described, by referring to the rule executing system 20 illustrated in FIG. 1B. According to FIG. 1B, the rule executing system 20 includes a user terminal 100, a first user terminal 200 (e.g., a first other user terminal), a second user terminal 300 (e.g., a second other user terminal), a third user terminal 400 (e.g., a third other user terminal), a fourth user terminal 500 (e.g., a fourth other user terminal), and a server apparatus 600.

Herein, the first to fourth user terminals 200 to 500 are separate terminals from each other. Meanwhile, first to third conditions and first to third actions are distinguished as such to simply constitute first to third rule. The first to third conditions may all be the same condition and the first to third actions may all be the same action according to an exemplary embodiment.

The user terminal 100 may be a terminal for creating rules. The user terminal 100 (e.g., rule creating user terminal) may create a first rule that states that the user terminal 100 performs the first action when the first condition is met in the first user terminal 200 according to a user command, and may transmit the created first rule to the server apparatus 600. Thereafter, when an event command to perform the first action is received from the external server apparatus 600 as the first condition is met in the first user terminal 200, the user terminal 100 performs the first action according to the received event command.

For example, the user terminal 100 may receive profile information including information regarding the first user terminal 200, information regarding the first user, and information regarding a condition and an action that can be performed in the user terminal 100 and the first user terminal 200, and create a first rule based on the received profile information. Herein, the information regarding the condition and the action that can be performed in the first user terminal 200 may indicate information regarding the conditions that can be met in the first user terminal 200 according to the type of the first user terminal 200 and the actions that can be performed by the first user terminal 200. For example, when the first user terminal 200 is a mobile phone or mobile terminal, the above information may indicate information regarding the conditions and the actions that can be performed by a mobile phone or mobile terminal. When the first user terminal 200 is a smart TV terminal, the above information may indicate information regarding the conditions and the actions that can be performed in a smart TV terminal.

Herein, the user terminal 100 may display a user interface (UI) for creating a first rule which includes at least one of a list for selecting the first user terminal 200, a list for establishing the first condition, and a list for establishing the first action based on the received profile information, and create the first rule through the displayed UI for creating the first rule.

Also, the user terminal 100 may create a first rule by selecting a rule automatically recommended by the external server apparatus 600 or the user terminal 100.

The user terminal 100 may create a second rule stating that the third user terminal 400 performs the second action when the second condition is met in the second user terminal 300 according to a user command. Further, the user terminal 100 may create a third rule stating that the fourth user terminal 500 performs the third action when the third condition is met in the user terminal 100 according to a user command.

The server apparatus 600 may receive from the user terminal 100 at least one of the first rule, the second rule, and the third rule created in the user terminal 100 and store it. Further, according to the received rule, the server apparatus 600 may transmit an event command to perform the first action to the user terminal 100 when the first condition is met in the first user terminal 200, transmit an event command to perform the second action to the third user terminal 400 when the second condition is met in the second user terminal 300, and transmit an event command to perform the third action to the fourth user terminal 500 when the third condition is met in the user terminal 100.

According to the received rule from the user terminal 100, the server apparatus 600 may execute the rule only when the user terminals including the corresponding rule except for the user terminal 100 approve the rule.

Thus, regarding the first rule, the first user terminal 200 may need to approve the first rule in order for the server apparatus 600 to transmit an event command for performing the first action to the user terminal 100 in response to receiving a first condition meeting message from the first user terminal 200. Further, regarding the second rule, the second user terminal 300 and the third user terminal 400 may need to approve the second rule in order for the server apparatus 600 to transmit an event command for performing the second action to the third user terminal 400 in response to receiving a second condition meeting message from the second user terminal 300. Further, regarding the third rule, the first user terminal 200 may need to approve the third rule in order for the server apparatus 600 to transmit an event command for performing the third action to the fourth user terminal 500 in response to receiving a third condition meeting message from the user terminal 100.

Further, the external server apparatus 600 may create a new rule by using the information regarding the first to the third rules received from the user terminal 100 and record information in which the received rules are executed, and recommend the new rule to the user terminal 100. Thereby, the user terminal 100 may receive the recommended rule from the external server apparatus 600, and create a rule by selecting the recommended rule.

The external server apparatus 600 may transmit profile information to the user terminal 100. The profile information may include at least one of the information regarding the terminals, the information regarding the terminal users, and the information regarding the conditions and the actions that can be performed in the terminals. Therefore, the user terminal 100 may create and display a UI for creating rules based on the received profile information, and create a rule according to a user command.

Further, when one or more conditions and one or more actions that can be performed in the terminals are added through a plug-in (e.g., wired) or wireless interface, the external server apparatus 600 may transmit the profile information regarding the one or more added conditions and the one or more added actions to the user terminal. Thus, the user terminal 100 may receive the profile information regarding the one or more added conditions and the one or more added actions from the external server apparatus 600, and update a UI for creating rules by using the received profile information. Adding condition and action through the wired or wireless interface will be described in detail below when explaining the server apparatus 600 of FIG. 7.

The following will explain the details and operation of a user terminal 100 in detail by referring to FIGS. 2 to 5.

Figure 2:
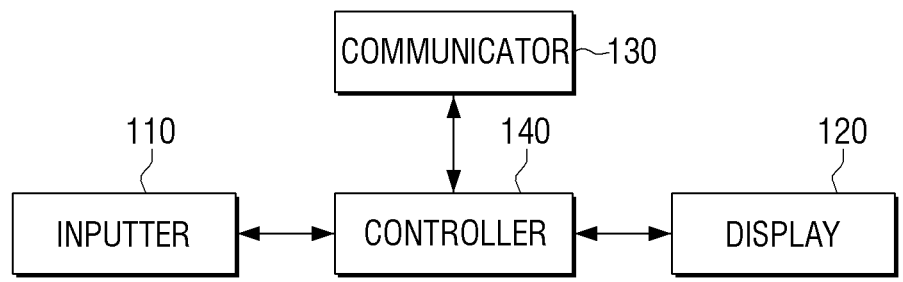
FIG. 2 illustrates a block diagram of a user terminal according to an exemplary embodiment.

FIG. 2 is a block diagram of a user terminal 100 according to an exemplary embodiment. Referring to FIG. 2, the user terminal 100 includes an inputter 110, a display 120, a communicator 130, and a controller 140.

The inputter 110 receives user commands for general manipulation of the user terminal 100. Specifically, the inputter 110 may receive user commands to create rules. The inputter 110 may receive user commands to create rules through the displayed UI for creating rules on the display 120. Further, when displaying rules automatically created and recommended by the external server apparatus 600 or the user terminal 100 on the display 120, the inputter 110 may receive user commands to create rules by selecting the displayed rules.

For the above, the inputter 110 may be various inputting devices provided to manipulate the user terminal 100 according to the type of the user terminal 100. For example, the inputter 110 may be implemented as a touch panel, a pointing device, a keyboard provided with a plurality of buttons, and a touch screen provided with a touch panel and the display 120. However, the inputter 100 is not limited thereto; it may also control the user terminal 100 through voice inputting or motion inputting of a user.

The display 120 displays various screens. Specifically, the display 120 may display a UI for creating rules. Herein, a UI for creating rules may include a list for selecting terminals, a list for establishing conditions, and a list for establishing actions. Further, the display 120 may display the rules automatically created and recommended by the external server apparatus 600 or the user terminal 100 in a format such as an alarm message, and a UI to create rules by selecting the recommended rules.

For the above, the display 120 may be various types of components provided to display video according to the types of the terminals. Specifically, the display 120 may be implemented to be a cathode ray tube (CRT), a liquid crystal display panel (LCD), a light emitting diode (LED) display, and a plasma display panel (PDP), although not limited thereto.

The communicator 130 may perform communication with external devices according to various types of communication methods. For example, the communicator 130 may perform communication with the external server apparatus 600.

The communicator 130 may receive the profile information including at least one of the information regarding the terminals connected with the external server apparatus 600, the information regarding the terminal users, and the information regarding the conditions and the actions that can be performed in the terminals from the external server apparatus 600, and receive the rules created and recommended from the external server apparatus 600.

Further, the communicator 130 may receive the profile information regarding the conditions and the actions added through the plug-in interface of the external server apparatus 600 from the external server apparatus 600, and the event commands to perform the actions from the external server apparatus 600.

Further, the communicator 130 may transmit the rules created in the user terminal 100 to the external server apparatus 600, and transmit the condition meeting message informing that the condition is met to the external server apparatus 600 when the user terminal 100 is a terminal meeting the condition according to the rule.

The communicator 130 may connect to the external server apparatus 600 by wire or wirelessly and perform communication by using various communication protocols such as HyperText Transfer Protocol (HTTP), HyperText Transfer Protocol over Secure Sockets Layer (HTTPS), Transmission Control Protocol (TCP), and User Datagram Protocol (UDP).

Thus, the communicator 130 may include various components that can perform communication by connecting to the external server apparatus 600 through a network such as the Internet and by using various communication protocols as described above. For example, the communicator 130 may include a LAN card, a Wi-Fi chip, a Bluetooth chip, and a Near Field Communication (NFC) chip, although it is not limited thereto.

The controller 140 may control general operation of the user terminal 100. For example, the controller 140 may create rules according to user commands. For example, the controller 140 may create a first rule that states that a user terminal 100 performs a first action when the first condition is met in a first user terminal 200 different from the user terminal 100, a second rule that states that a third user terminal 400 performs a second action when a second condition is met in a second user terminal 300, and a third rule that states that a fourth user terminal 500 performs a third action when a third condition is met in the user terminal 100 according to user commands.

The controller 140 may receive the profile information including information regarding the first to the fourth user terminal 200 to 500, the information regarding the first to the fourth user, and the information regarding the conditions and the actions that can be performed in the first to the fourth user terminal 200 to 500, and the profile information regarding the condition and action added through the wired or wireless interface, and create the first to the third rules based on the received profile information.

Specifically, the controller 140 may create a UI for creating rules based on the received profile information through the communicator 130, display the created UI on the display 120, and create the first to the third rules according to the user commands inputted through the inputter 110. Herein, a UI for creating rules may include at least one of the list for selecting terminals, the list for establishing conditions, and the list for establishing actions; however, a UI for creating rules does not have to include the above, and may be merely a UI to create rules.

Figure 3:
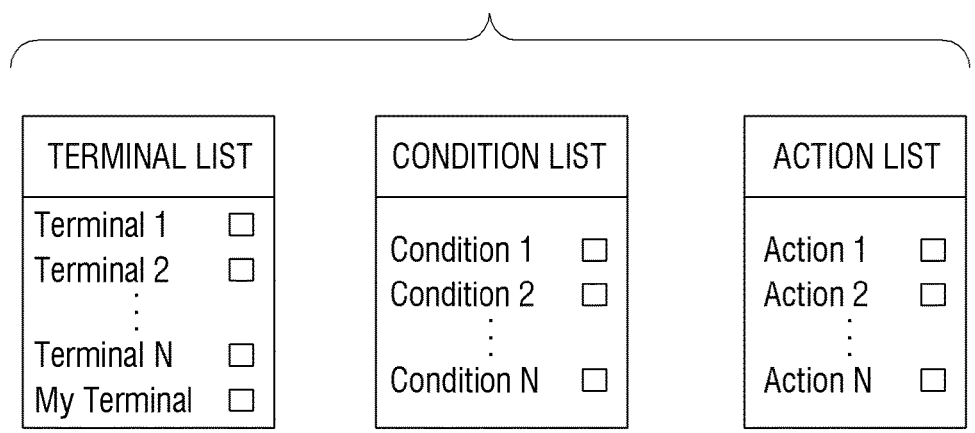
FIG. 3 illustrates a user interface (UI) for creating rules according to an exemplary embodiment.

The following will explain a UI for creating rules and a rule creating process through a UI for creating rules according to an exemplary embodiment by referring to FIGS. 3 and 4.

FIG. 3 illustrates an example regarding a UI for creating rules according to an exemplary embodiment. FIG. 3 illustrates an example of a terminal list to select the terminals including the rules, an example of a condition list to select the conditions including the rules, and an example of an action list to select the actions including the rules.

FIGS. 3, 4A, 4B, and 4C will be explained below by assuming that a first terminal to an Nth terminal indicate a first user terminal 200 to an Nth user terminal, and "my terminal" indicates the user terminal 100 to create rules.

Specifically, the controller 140 may store the received profile information in a storage (e.g., memory) when the profile information is received through the communicator 130 from the external server apparatus 600. Thereby, the controller 140 may create a UI for creating rules illustrated in FIG. 3 by using various pieces of the stored profile information in the storage.

For example, the controller 140 may create the terminal list of FIG. 3 by using the information regarding the first user terminal 200 to the fourth user terminal 500 and the information regarding the first user to the fourth user. Further, the controller 140 may create the condition list and the action list of FIG. 3 by using the information regarding the conditions and the actions that can be performed in the first to the fourth user terminal 200 to 500 and the profile information regarding the conditions and the actions added through the plug-in interface. However, examples regarding UI for creating rules generated by using the received profile information from the external server apparatus 600 are not limited to the examples of FIG. 3.

The generated UI for creating rules may be displayed on a display 120, and a user may create rules by inputting user commands on the displayed UI for creating rules.

Figure 4A:
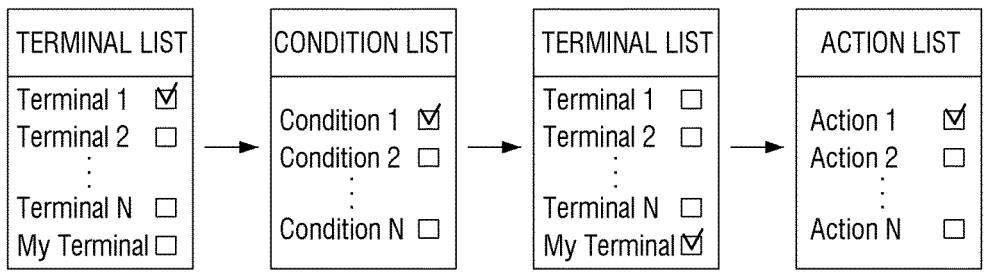
FIGS. 4A, 4B, and 4C illustrate a process of creating rules by the user terminal according to an exemplary embodiment.
Figure 4B:
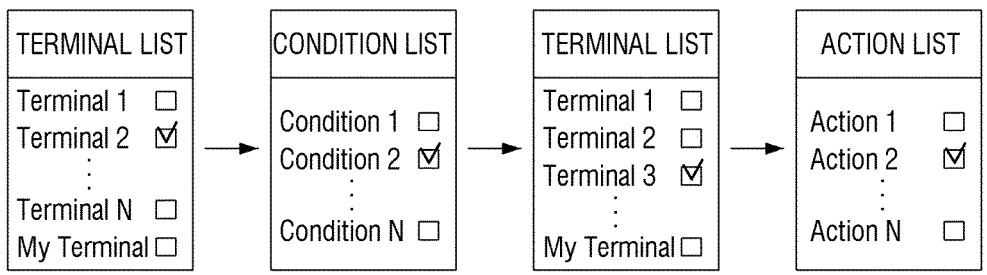
Figure 4C:
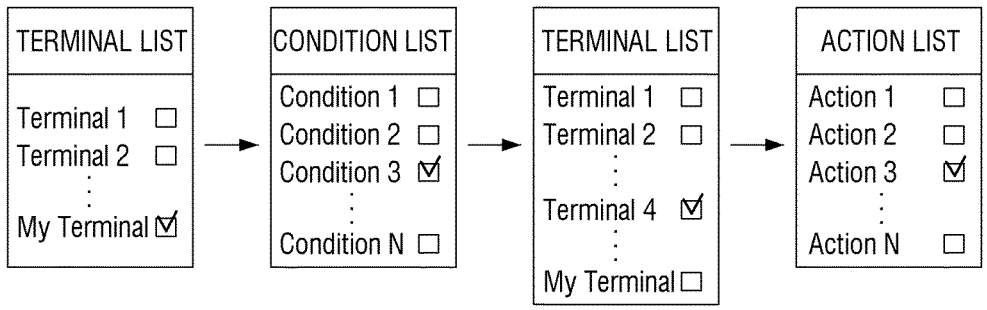

FIGS. 4A to 4C describe an example in which rules are created by using the illustrated UI for creating rules in FIG. 3. Referring to FIGS. 4A to 4C, a UI for creating rules may be displayed according to a following order of the terminal list for selecting terminals in which the conditions will be met, the condition list for the conditions to be met in the selected terminal, the terminal list for selecting terminals in which the actions will be performed, and the action list for the actions to be performed in the selected terminal so as to create rules through UI for creating rules.

Therefore, the user of the user terminal 100 may create the first rule stating that the user terminal 100 (e.g., my terminal) performs the first action when the first condition is met in the first user terminal 200 as illustrated in FIG. 4A, create the second rule stating that the third user terminal 400 performs the second action when the second condition is met in the second user terminal 300 as illustrated in FIG. 4B, and create the third rule stating that the fourth user terminal 500 performs the third action when the third condition is met in the user terminal as illustrated in FIG. 4C.

FIGS. 4A to 4C exemplify the displaying UI for creating rules in a format that the terminals to meet the conditions are first selected and the actions to be performed in corresponding terminals are next selected. However, the displaying order of UI for creating rules is not limited to that. For example, a UI for creating rules may be displayed in an order of selecting the conditions, the terminals to meet the conditions, the actions, and the terminals to perform the actions.

Further, although FIGS. 4A to 4C exemplify that the terminal list, the condition list, and the action list are uniformly displayed, the method displaying UI for creating rules is not limited to that. Because the conditions to be met and the actions to be performed may be different from each other according to the types of the terminals, according to an exemplary embodiment, the display might only display the conditions to be met and the actions to be performed in the selected terminals on the condition list and the action list.

Further, when the conditions and the actions are first selected and the terminals are next selected, according to an exemplary embodiment, the display might only display the terminals in which the selected conditions or the selected actions can be performed on the terminal list when the conditions or the actions are selected on the condition list or the action list.

For example, when the user terminal 100 is mobile phone, and the first user terminal 200 is MP3 player excluding a function for transmitting and receiving messages, a condition in which a new message is received might not be displayed on the condition list if the MP3 player is selected to be the user terminal for meeting the condition (e.g., CONDITION MEETING TERMINAL).

Further, as illustrated in the example of FIGS. 4A to 4C, when the terminal list, the condition list and the action list are uniformly displayed, it may not select the conditions that cannot be met or the actions that cannot be performed in the selected terminals.

The controller 140 may control the communicator 130 to receive the rules automatically created and recommended by the external server apparatus 600, and create rules by selecting the received rules. A message describing the recommended rules may be displayed and a UI for creating rules may be separately displayed by selecting the message. A specific method automatically creating rules in the external server apparatus 600 and recommending them to the user terminal 100 will be explained below in describing the server apparatus 600.

Further, the controller 140 may store the information regarding the created rules by the user terminal 100 and the information regarding the conditions and the actions used to create the rules in the storage. The controller 140 may receive the information regarding the rules created by the other user terminals or the information regarding the record in which the rules are executed, and store the information in the storage. Thereby, the controller 140 may automatically create and recommend rules based on the stored information in the storage.

For example, the controller 140 may extract information regarding the most used condition and action by analyzing one or more rules stored in the storage, and create new rules by recombining the extracted condition and action. However, this is merely an example. Examples of creating new rules by the controller 140 are not limited to this.

For example, the controller 140 may extract usage patterns of the user terminal 100 and the other user terminals (i.e., the terminals included in the rules), by analyzing the rule executing record information stored in the storage, and create new rules based on the extracted usage pattern information. In other words, usage patterns of the user terminals may be respectively extracted through the record information in which the conditions are met and the actions are performed. For example, the controller 140 may create rules created by other user terminals having similar usage patterns to that of the user terminal 100, to be rules that can be recommended to a user.

The rules automatically created by the controller 140 may be displayed on the display 120 and recommended to a user for selecting. For example, the controller 140 may display a message informing that new rules are created along with the descriptions of the new rules on the display 120 to recommend the new rules. Further, when there is more than one created new rule, the controller 140 may display a recommended rule list on the display 120 to recommend rules to a user. Thus, a user of the user terminal 100 may create rules by selecting one or more of the displayed recommended rules on the display 120 through the inputter 110.

The controller 140 may control the communicator 130 to transmit the created rules to the external server apparatus 600. Further, the controller 140 may control the communicator 130 to receive the event command and perform the first action according to the received event command when an event command to perform the first action is transmitted from the external server apparatus 600 because the first condition is met in the first user terminal 200 according to the first rule.

According to a first rule, when the first condition is met in the first user terminal 200, the first user terminal 200 may transmit a first condition meeting message informing that the first condition is met to the external server apparatus 600. The external server apparatus 600 receiving the message may transmit an event command to perform the first action to the user terminal 100 according to the first rule, and the user terminal 100 may receive the event command and perform the first action according to the first action performing event command.

Figure 5A:
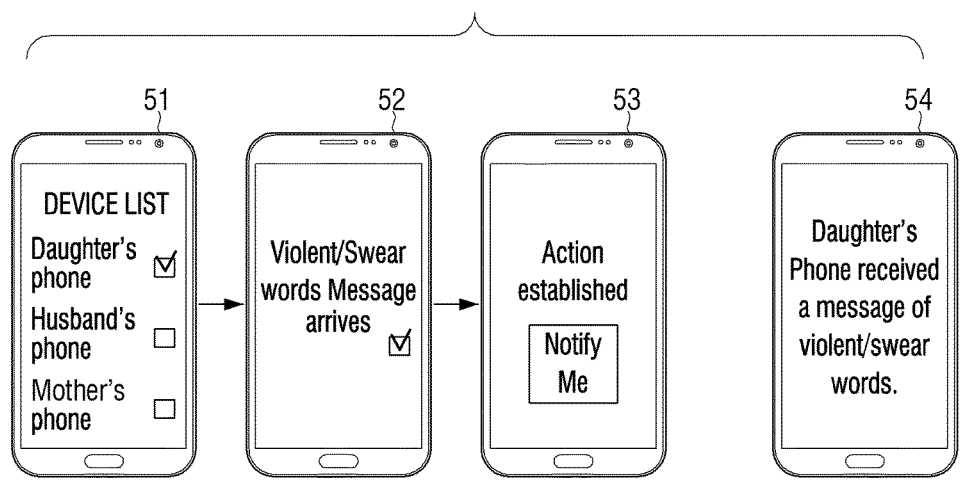
FIGS. 5A and 5B illustrate a process of creating rules by the user terminal according to another exemplary embodiment and the implemented examples.
Figure 5B:
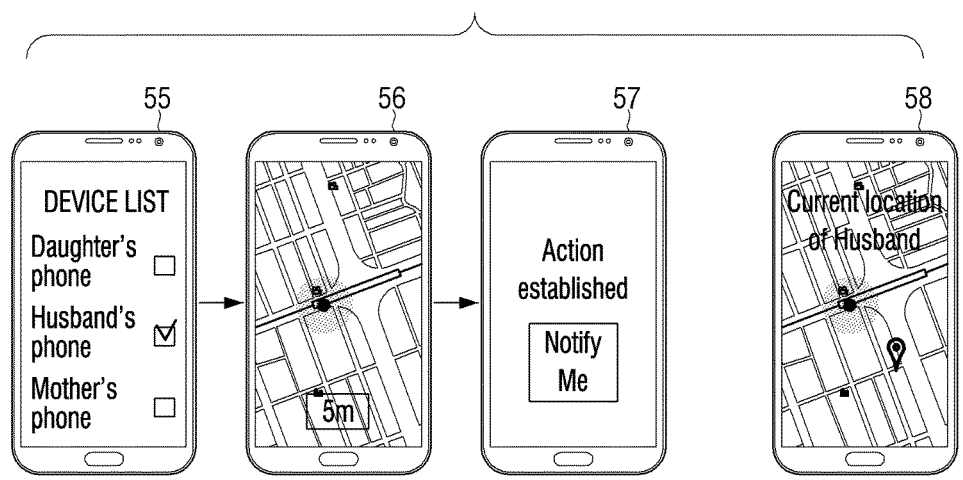

FIGS. 5A and 5B illustrate an example in which a first rule is created and a first action is performed in the user terminal 100. Referring to FIGS. 5A and 5B, drawing reference numerals 51 to 53 and 55 to 57 indicate examples in which a first rule is created in the user terminal 100, and drawing reference numerals 54 and 58 indicate examples in which a first action is performed. In the examples of FIGS. 5A and 5B the user terminal 100 and the terminals on the terminal list are mobile phones.

Referring to a drawing reference numeral 51 of FIG. 5A, the terminal list, including a daughter's phone, a husband's phone, and a mother's phone, may be displayed on the user terminal 100, and a user of the user terminal 100 may select the daughter's phone to be the condition meeting terminal. Further, referring to a drawing reference numeral 52, the first condition may be selected by stating that violent words or swear words are received by the daughter's phone, and referring to a drawing reference numeral 53, "Notify me" may be selected to be the first action that will be performed when the first condition is met.

Thus, the example of FIG. 5A illustrates creating a first rule stating that when the first condition in which violent or swear words are received by the daughter's phone (that is the first user terminal 200), the first action displaying an alarm message in the user terminal 100 may be performed.

Thereafter, when the first condition is met by receiving violent or swear words with the daughter's phone, a first condition meeting message may be transmitted to the external server apparatus 600 from the daughter's phone, and the external server apparatus 600 may receive the message and transmit an event command to perform the first action to the user terminal 100 according to the first rule. The user terminal 100 receiving the event command may perform the first action by displaying that the daughter's phone received violent or swear words. Referring to a drawing reference numeral 54, the first action may be performed by displaying the alarm informing that the daughter's phone receives violent or swear words on the user terminal 100.

FIG. 5B illustrates another example in which a first rule is created and executed. Referring to a drawing reference numeral 55 of FIG. 5B, a user of the user terminal 100 may select the husband's phone to be the condition meeting terminal. Further, referring to a drawing reference numeral 56, a certain local area may be established by selecting a first condition in which a position of the husband's phone is out of the certain local area. Further, referring to a drawing reference numeral 57, "Notify me" may be selected as a first action that will be performed when the first condition is met.

Thus, the example of FIG. 5B describes creating a first rule stating that when the first condition is met by recognizing that the husband's phone (that is the first user terminal 200) is out of an established local area established by a user of the user terminal 100, the first action displaying an alarm in the user terminal 100 is performed.

When meeting the first condition stating that the husband's phone is out of the established local area by a user of the user terminal 100, a first condition meeting message may be transmitted from the husband's phone to the external server apparatus 600, and the external server apparatus 600 may receive the message and transmit an event command to perform the first action to the user terminal 100 according to the first rule. The user terminal 100 receiving the event command may perform the first action by displaying a current location of the husband's phone with a message informing that the husband's phone is out of the established local area. Referring to a drawing reference numeral 58, the first action may be performed by displaying a current location of the husband's phone on the user terminal 100.

In the above described examples of FIGS. 5A and 5B, UIs for creating rules are different from those of FIGS. 3 and 4A to 4C. Further, the examples of performing the first action are different between FIG. 5A and FIG. 5B. Thus, UIs for creating rules of the user terminal 100 may be variously implemented, and actions performed by the user terminal 100 may be variously implemented when conditions are met.

Figure 6:
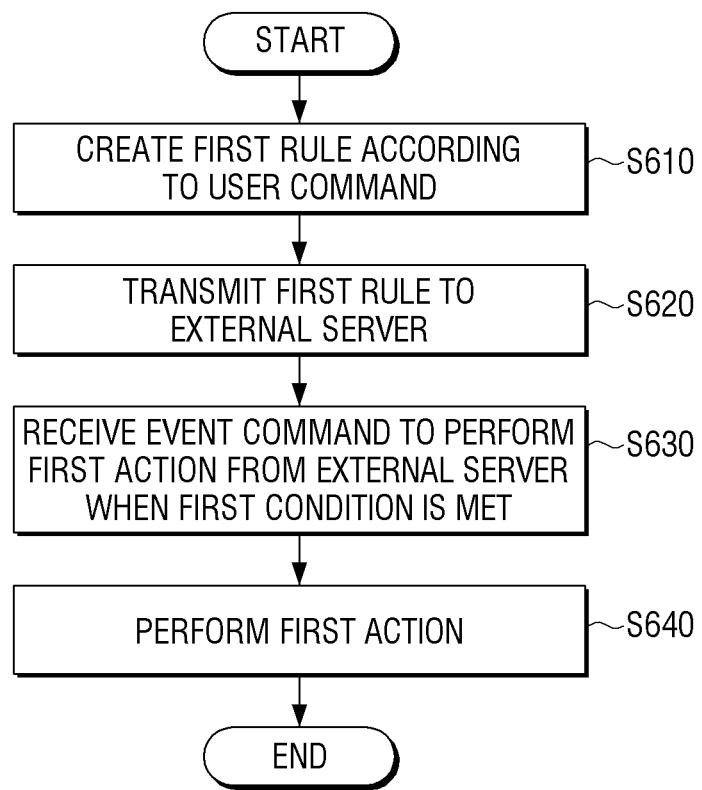
FIG. 6 is a flowchart illustrating a rule executing method of the user terminal according to an exemplary embodiment.

FIG. 6 is a flowchart illustrating a rule executing method of the user terminal 100 according to an exemplary embodiment. Referring to FIG. 6, the user terminal 100 may create a first rule according to a user command at S610 and transmit the created first rule to the external server apparatus 600 at S620.

In this example, the first rule states that when the first condition is met in the first user terminal 200, which is a different terminal from the user terminal 100, the user terminal 100 performs the first action.

The controller 140 may receive profile information including at least one of the information regarding the first user terminal 200, the information regarding the first user, and the information regarding the conditions and the actions that can be performed in the user terminal 100 and the first user terminal 200 transmitted from the external server apparatus 600 through the communicator 130, and create the first rule by using the received profile information.

For example, the controller 140 may create and display a UI for creating the first rule on the display 120 based on the received profile information through the communicator 130, and create the first rule by manipulating the UI for creating the first rule according to a user command through the inputter 110. Herein, the UI for creating the first rule may include at least one from among the list for selecting the first user terminal 200 different from the user terminal 100, the list for establishing the first condition, and the list for establishing the first action.

The controller 140 may receive the rules automatically created and recommended by the external server apparatus 600 through the communicator 130, and create the first rule according to a user command to select the recommended rules through the inputter 110. Also, the controller 140 may create the first rule by selecting the rules automatically created and recommend in the user terminal 100.

Further, the controller 140 may control the communicator 130 to transmit the created first rule to the external server apparatus 600.

According to a user command received through the inputter 110, the controller 140 may create the second rule stating that the third user terminal 400 performs the second action when the second action is met in the second user terminal 300 different from the user terminal 100, and create the third rule stating that the fourth user terminal 500 performs the third action when the third condition is met in the user terminal 100. Further, the controller 140 may control the communicator 130 to transmit the created second and third rules to the external server apparatus 600.

The user terminal 100 may receive an event command to perform the first action from the external server apparatus 600 when the first condition is met at S630, and perform the first action according to the received event command at S640.

For example, when the first condition is met in the user terminal 100, the first user terminal 200 may transmit a first condition meeting message to the external server apparatus 600. The external server apparatus 600 may transmit an event command to perform the first action to the user terminal 100 according to the first rule when a first condition meeting message is received from the first user terminal 200. Thereby, when the event command to perform the first action is received through the communicator 130 from the external server apparatus 600, the controller 140 may perform the first action.

Figure 7:
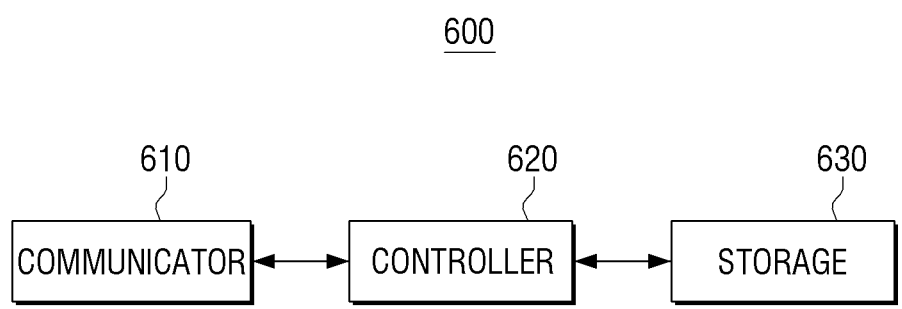
FIG. 7 illustrates a block diagram of a server apparatus according to an exemplary embodiment.

FIG. 7 is a block diagram of the server apparatus 600 according to an exemplary embodiment. Referring to FIG. 7, the server apparatus 600 may include a communicator 610, a controller 620, a storage 630, and a wired or wireless interface.

The communicator 610 may communicate with external terminals. For example, the communicator 610 may receive various rules including a first rule to third rule created from the user terminal 100. Further, the communicator 130 may receive a condition meeting message informing that the condition is met from the condition meeting terminals, and transmit an event command to perform the action to the action performing terminals according to the received rules.

Further, the communicator 610 may transmit a message asking corresponding rules and whether to approve the rules to the terminal included in the rules, and receive an approving message regarding the rules from the terminals.

For the above, the communicator 610 may connect to a plurality of the external terminals by wire or wirelessly, and communicate using various communication protocols such as HTTP, HTTPS, TCP, and UDP.

Thus, the communicator 610 may be implemented through various components that can connect to a plurality of the external terminals through a network such as internet and communicate by using the above various communication protocols. For example, the communicator 610 may include a LAN card, a Wi-Fi chip, a Bluetooth chip, and an NFC chip, although not limited thereto.

The storage 630 may store various data. For example, the storage 630 may store information regarding received rules and information regarding the record executing the rules from the user terminal 100 in order to approve the rules and create rules.

Further, the storage 630 may store profile information including at least one of information regarding the terminals, information regarding the terminal users, and information regarding the conditions and the actions that can be performed in the terminals.

For example, the storage 630 may receive the information regarding the users, the information regarding the user terminals, and the profile information regarding the types of the terminals, and the conditions and the actions that can be performed in the corresponding terminals, from users joining the rule executing service provided through the server apparatus 600 by the service provider. The profile information may be stored in the storage 630.

When approving the rules, the storage 630 may store information regarding approving the corresponding rules of the terminals included in the rules. For example, information regarding approving the first rule of the first user terminal 200 may be stored regarding the first rule, information regarding approving the second rule of the second user terminal 300 and the third user terminal 400 may be stored regarding the second rule, and information regarding approving the third rule of the fourth user terminal 500 may be stored regarding the third rule.

The wired or wireless interface is an interface that may add one or more conditions and one or more actions that can be performed in the terminals connected to the server apparatus 600. Specifically, the conditions and the actions that can be performed in the terminals may be different according to the type and the function of the terminals. For example, a related home appliance terminal without a message service function may not transmit or receive messages such as SMS (Short Message Service). Thus, the conditions and the actions that can be performed in the home appliance terminal might not be receiving or transmitting SMS. However, regarding the mobile terminal such as mobile phone, receiving SMS may be one condition that can be performed, and transmitting SMS may be one action that can be performed.

However, conditions and actions that can be performed in one type of the terminals may be added to another terminal according to an exemplary embodiment. For example, new functions may be added by upgrading software of the terminal, or the conditions and the actions that can be performed in a terminal may be added by another service provider providing services to the terminal.

The following will further describe the latter example. When the terminal using the rule executing service is mobile phone, a mobile service provider may provide the conditions and the actions that can be performed in the mobile phone based on new LBS (Location Based Service) to the server apparatus 600 when services such as LBS is upgraded. Therefore, the controller 620 of the server apparatus 600 may add a new condition and action provided from the mobile service provider through the plug-in interface, and store in the storage 630. Meanwhile, the conditions and the actions added to the server apparatus 600 through the plug-in interface may be transmitted to the terminals and used in creating rules in the terminals.

The controller 620 may control a general operation of the server apparatus 600. For example, the controller 620 may control the communicator 610 to transmit profile information stored in the storage 630 including information regarding the terminals, information regarding the terminal users, and information regarding the conditions and the actions that can be performed in the terminals to the user terminal 100 in order to create rules by the user terminal 100.

Herein, the information regarding the terminals may include information regarding at least one of the terminal type, the manufacturer, and the version. Information regarding the terminal users may include information regarding at least one of the name, the age, and the sex of the users using the corresponding terminals. Further, the information regarding the conditions and the actions that can be performed in the terminals may include information regarding the conditions that can be met in the corresponding terminals and the actions that can be performed in the corresponding terminals according to the type and the function of the corresponding terminals.

Further, the controller 620 may control the communicator 610 to transmit the profile information regarding the one or more added conditions and the one or more added actions through the plug-in interface that can be performed in the terminals to the user terminal 100. The user terminal 100 may receive the profile information regarding one or more conditions and one or more actions added through the plug-in interface from the server apparatus 600, and use the received profile information to be based for creating rules.

Therefore, when various rules including a first rule to a third rule may be created and received from the user terminal 100 through the communicator 610, the controller 620 may store and execute the received rules.

For example, if the first rule is received from the user terminal 100, the controller 620 may execute the first rule by transmitting an event command to perform the first action to the user terminal 100 when a first condition meeting message is transmitted from the first user terminal 200. Further, if the second rule is received from the user terminal 100, the controller 620 may execute the second rule by transmitting an event command to perform the second action to the third user terminal 400 when a second condition meeting message is transmitted from the second user terminal 300. Further, if the third rule is received from the user terminal 100, the controller 620 may execute the third rule by transmitting an event command to perform the third action to the fourth user terminal 500 when a third condition meeting message is transmitted from the user terminal 100.

According to an exemplary embodiment, the controller 620 may determine whether to approve the rules regarding the terminals included in the rules after receiving the rules from the user terminal 100. Therefore, when there is the approving of the rules regarding the terminals included in the rules, the controller 620 may execute the rules by transmitting event commands to perform the actions to the action performing terminals when condition meeting messages are received from the condition meeting terminals according to the rules. However, if there is no approving of the rules regarding the terminals included in the rules, the controller 620 may request the approving for the rules to the terminals included in the rules through the communicator 610, and execute the corresponding rules only when the approving regarding the corresponding rules is received.

When the approving for the corresponding rules is stored or not stored, the controller 620 may request the approving for the corresponding rules to the terminals included in the corresponding rules. When the controller 620 receives the approving, the corresponding rules may be registered, and the registered rules may be executed. Meanwhile, one or more exemplary embodiments will be described in detail by referring to FIGS. 8 to 11 below.

The controller 620 may store the information regarding the rule executing record on the storage 630. Specifically, the controller 620 may receive a condition meeting message from the condition meeting terminal according to the received rule, and store the information regarding the record in which event commands for performing the actions are transmitted to the action performing terminal. For example, the controller 620 may store the information regarding the record that which actions are performed in which terminals at which time by meeting which conditions are met in which terminals at which time.

The controller 620 may create new rules by using the stored information on the storage 630, and transmit the created new rules to the user terminal 100. Specifically, the controller 620 may create new rules by using the information regarding the stored rules on the storage 630 or the information regarding the rule executing record.

For example, the controller 620 may extract information regarding the conditions and the actions most frequently used in the rules created in the user terminal 100 by analyzing at least one of the rules received from the user terminal 100, and create new rules by applying the terminal selected by a user and another terminal.

Thus, when the second rule is most frequently created by the user terminal 100, the controller 620 may create new rules by combining the examples of performing the second condition and the second action in the second user terminal 300 selected by a user and another terminal than the third user terminal 400.

However, this is merely an example. Examples of creating new rules by the controller 620 are not limited to this. For example, when keeping a record of executing one or more rules received from one or more user terminals for a predetermined number or for a predetermined time, the controller 620 may extract the information regarding the usage patterns of each terminal by analyzing the executing record. Thus, the rule executing record indicates a history in which a specific condition is met in a specific terminal, and a specific action is performed in a specific terminal according to the condition. The usage patterns regarding which terminal shows which usage trends may be extracted from the rule executing record. Thereby, the controller 620 may specify another user terminal having similar usage patterns to those of the user terminal 100, and create the rules which are created by the specified another user terminal to be recommended rules to the user terminal 100.

The controller 620 may recommend the new rules by transmitting the created new rules through the communicator 610 to the user terminal 100. The controller 620 may recommend the new rules by transmitting another message informing that the new rules are created with the created new rules. Further, when there are multiple created new rules, the controller 620 may transmit the recommended rule list to the user terminal 100.

The controller 620 may transmit the information regarding the rules stored in the storage 630 and the information regarding the rule executing record to the user terminal 100 through the communicator 610. Therefore, the user terminal 100 may directly create and recommend the rules by using the information regarding the various rules stored in the storage 630 of the server apparatus 600 and the information regarding the rule executing record.

Figure 8:
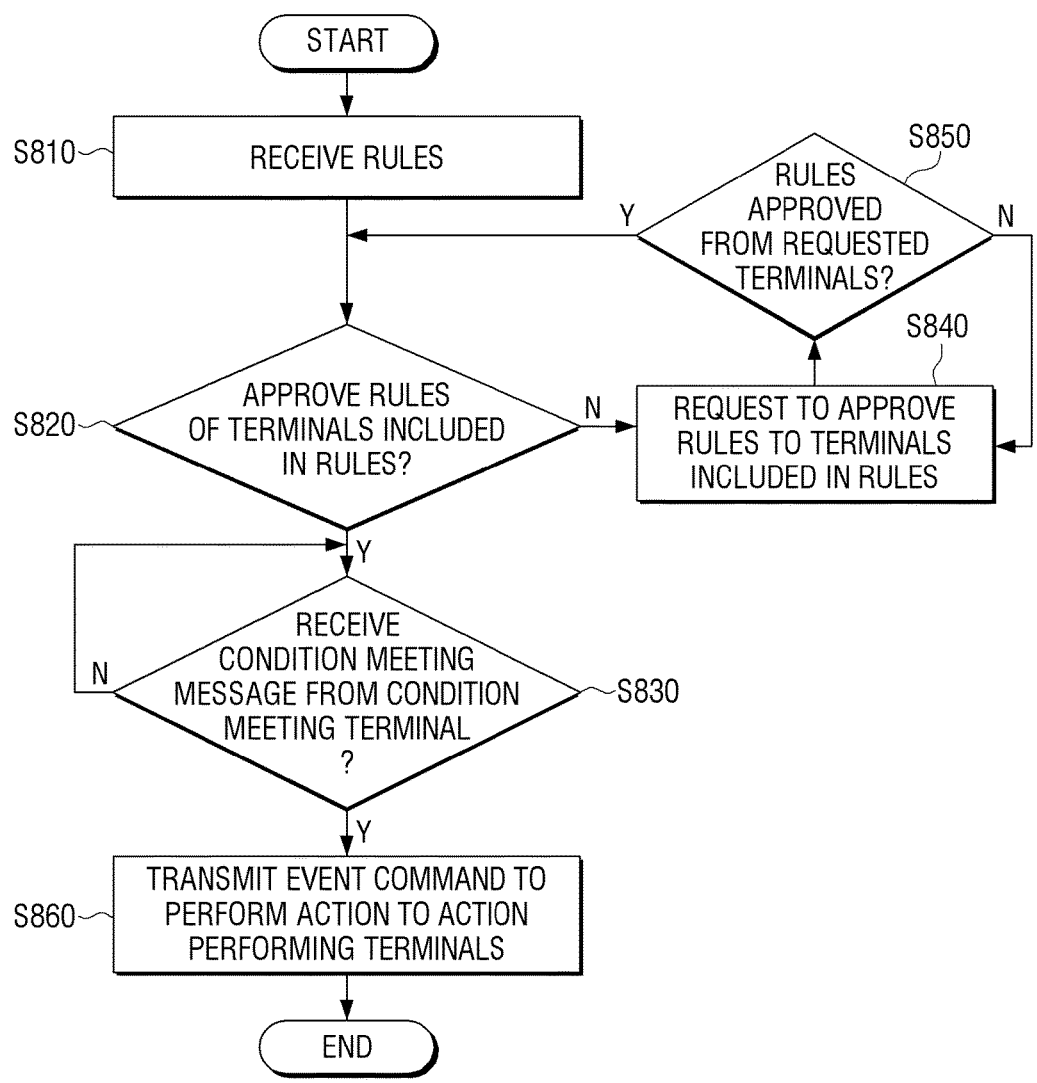
FIG. 8 is a flowchart illustrating an operation of the server apparatus according to an exemplary embodiment.

FIG. 8 is a flowchart illustrating an operation of the server apparatus 600 according to an exemplary embodiment. Referring to FIG. 8, the controller 620 may receive the created rules through the communicator 610 from the user terminal 100 at S810. At S820, the controller 620 may determine whether to approve the corresponding rules regarding the terminal included in the received rules.

Approving for the rules regarding the terminal included in the rules may be done with various formats. For example, regarding the first rule, when the first user terminal 200 approves a user of the user terminal 100, all the created rules in all the terminals used by the user in addition to the user terminal 100 may be approved by the first user terminal 200. Meanwhile, when the first user terminal 200 approves the user terminal 100, all the rules created by the user terminal 100 may be approved by the first user terminal 200. Further, when the first user terminal 200 approves the first rule, only the first rule created by the user terminal 100 may be approved by the first user terminal 200.

The approving regarding various formats of the rules may be stored in the storage 630 when the approving is performed. When the rules are received, the controller 620 may determine whether to approve the corresponding rules regarding the terminals included in the corresponding rules.

When approving the rules regarding the terminals included in the rules at S820-Y, the controller 620 may determine whether to receive a condition meeting message from the condition meeting terminals of the corresponding rules at S830. Further, when a condition meeting message is received through the communicator 610 at S830-Y, the controller 620 may control the communicator 610 to transmit an event command to perform the actions to the action performing terminals regarding the corresponding rules at S860.

When there is no approving the rules regarding the terminals included in the rules at S820-N, the controller 620 may request the approving for the corresponding rules to the terminals included in the corresponding rules through the communicator 610 at S840. Further, when receiving the approving for the corresponding rules from the requested terminals through the communicator 610 at S850-Y, the corresponding rules may be executed.

Figure 9:
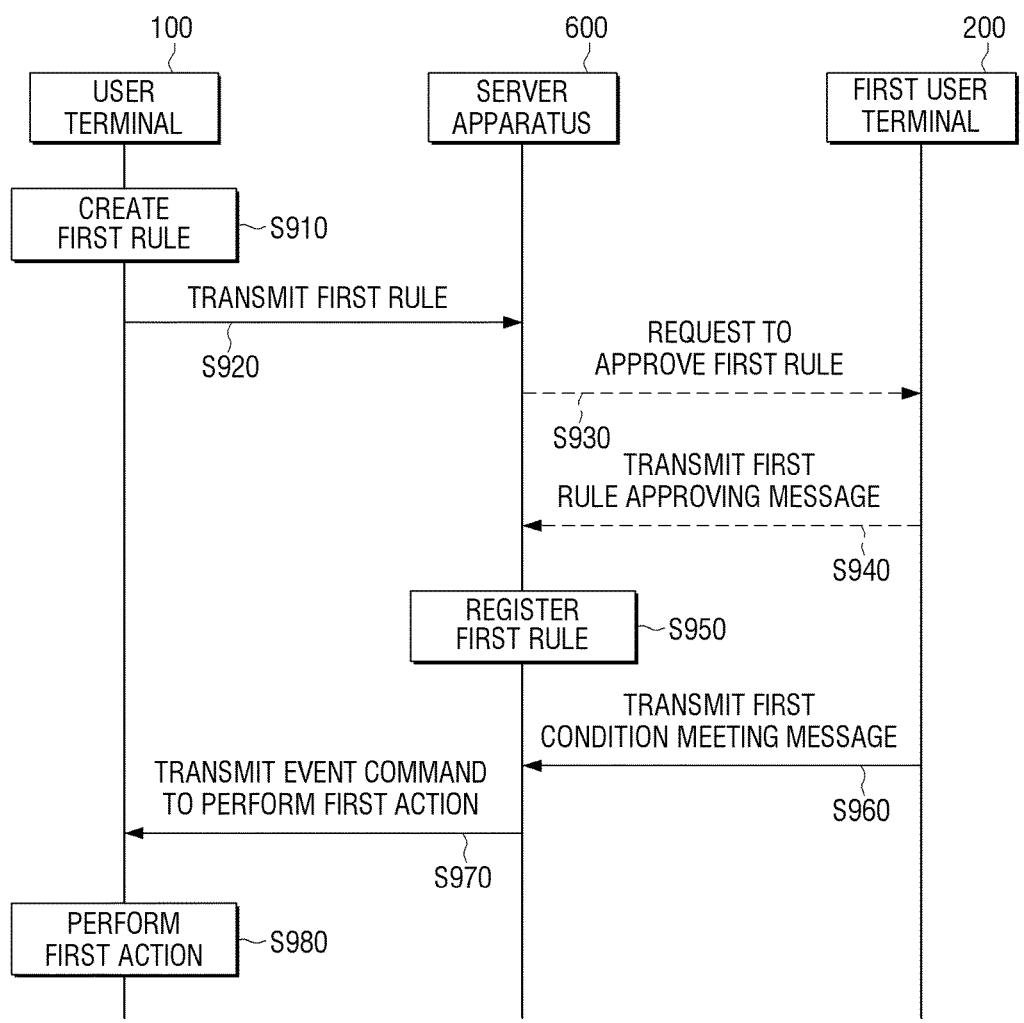
FIG. 9 is a flowchart illustrating a process of creating and executing a first rule according to an exemplary embodiment.
Figure 10:
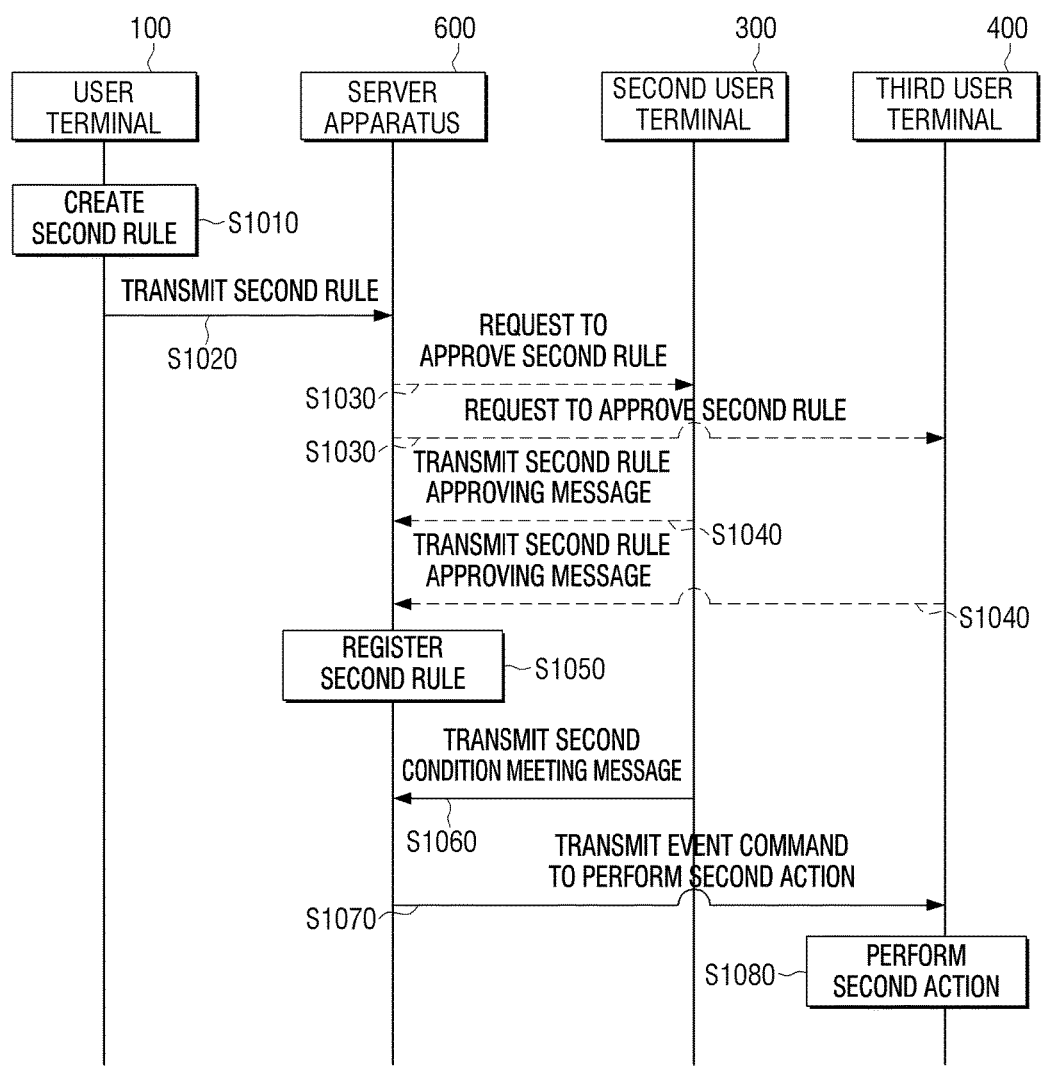
FIG. 10 is a flowchart illustrating a process of creating and executing a second rule according to an exemplary embodiment.
Figure 11:
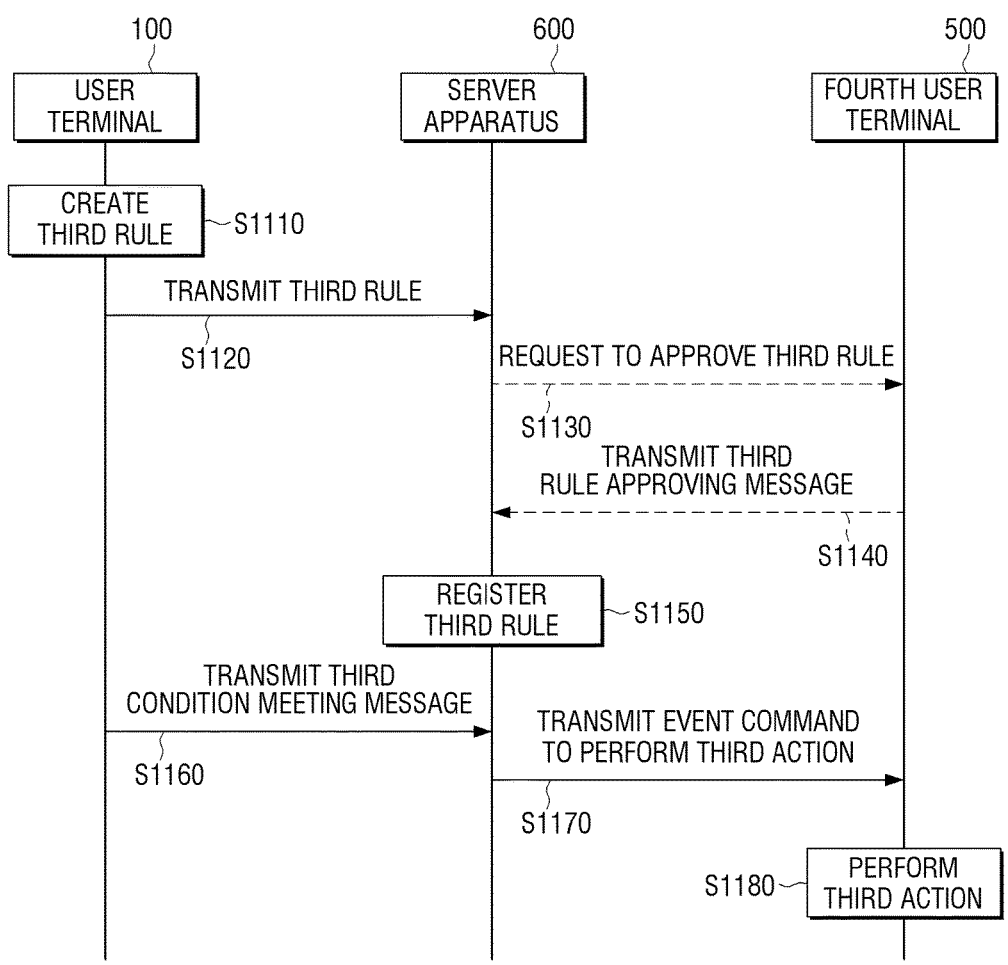
FIG. 11 is a flowchart illustrating a process of creating and executing a third rule according to an exemplary embodiment.

FIGS. 9 to 11 are flowcharts illustrating a process of creating and executing the first rule to the third rule according to an exemplary embodiment.

FIG. 9 is a flowchart illustrating that a first rule is created and executed according to an exemplary embodiment. Referring to FIG. 9, the user terminal 100 may create a first rule at S910. The first rule may be a rule stating that the first action is performed by the user terminal 100 when the first condition is met in the first user terminal 200. The user terminal 100 may create the first rule based on the profile information received from the server apparatus 600.

When the user terminal 100 transmits the first rule to the server apparatus 600 at S920, the server apparatus 600 may receive the first rule, and request the approving of the first rule to the user terminal 200 included in the first rule at S930. When an approving message regarding the first rule is transmitted from the first user terminal 200 at S940, the server apparatus 600 may register the first rule at S950, and execute the first rule. When a first condition meeting message is transmitted from the first user terminal 200 at S960, the server apparatus 600 may receive the message and transmit an event command to perform the first action to the user terminal 100 according to the first rule at S970. The user terminal 100 may receive the event command and perform the first action at S980.

If the server apparatus 600 has already stored the approving regarding the first rule of the first user terminal 200, the server apparatus 600 may not need to request the approving regarding the first rule to the first user terminal 200 at S930. S940 receiving an approving message of the first rule from the first user terminal 200 might not need to be performed. The server apparatus 600 may receive the first rule from the user terminal 100, register the first rule at S950, and execute the first rule.

FIG. 10 is a flowchart illustrating that a second rule is created and executed according to an exemplary embodiment. Referring to FIG. 10, the user terminal 100 may create a second rule at S1010. Herein, the second rule indicates a rule stating that the third user terminal 400 performs the second action when the second condition is met in the second user terminal 300. A user terminal 100 may create the second rule based on the received profile information from the server apparatus 600 as described above.

When the user terminal 100 transmits the second rule to the server apparatus 600 at S1020, the server apparatus 600 may receive the second rule and request the approving of the second rule to the second user terminal 300 and the third user terminal 400 at S1030. When transmitting an approving message regarding the second rule from the second user terminal 300 and the third user terminal 400 at S1040, the server apparatus 600 may register the second rule at S1050, and execute the second rule. When the second user terminal 300 transmits a second condition meeting message at S1060, the server apparatus 600 may receive the message, and transmit an event command to perform the second action to the third user terminal 400 according to the second rule at S1070. The third user terminal 400 may receive the event command and perform the second action at S1080.

When the server apparatus 600 has already stored the approving for the second rule regarding the second user terminal 300 and the third user terminal 400, the server apparatus 600 may not need to request the approving for the second rule to the second user terminal 300 and the third user terminal 400 at S1030. S1040 receiving the approving for the second rule from the second user terminal 300 and the third user terminal 400 might not need to be performed. The server apparatus 600 may receive and register the second rule from the user terminal 100 at S1050, and execute the second rule.

FIG. 11 is a flowchart illustrating that a third rule is created and executed according to an exemplary embodiment. Referring to FIG. 11, the user terminal 100 may create a third rule at S1110. Herein, the third rule indicates a rule stating that the fourth user terminal 500 performs the third action when the third condition is met in the user terminal 100. A user terminal 100 may create the third rule based on the received profile information from the server apparatus 600 as described above.

When the user terminal 100 transmits the third rule to the server apparatus 600 at S1120, the server apparatus 600 may receive the third rule, and request the approving for the third rule to the fourth user terminal 500 included in the third rule at S1130. When an approving message of the third rule is transmitted from the fourth user terminal 500 at S1140, the server apparatus 600 may register the third rule at S1150, and execute the third rule. Specifically, when a third condition meeting message is transmitted from the user terminal 100 at S1160, the server apparatus 600 may receive the message and transmit an event command to perform the third action to the fourth user terminal 500 according to the third rule at S1170. The fourth user terminal 500 may receive the event command and perform the first action at S1180.

When the server apparatus 600 stores the approving for the third rule regarding the fourth user terminal 500, the server apparatus 600 may not need to request the approving for the third rule to the fourth user terminal 500 at S1130. S1140 receiving the approving for the third rule from the fourth user terminal 500 might not need to be performed. The server apparatus 600 may receive the third rule from the user terminal 100, immediately register the third rule at S1150, and execute the third rule.

Figure 12:
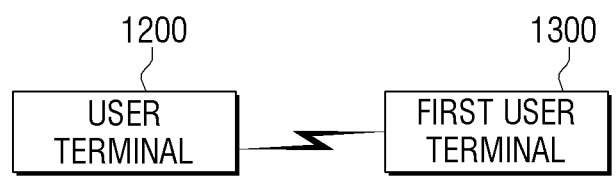
FIG. 12 is a diagram illustrating an exemplary embodiment of executing rules between the terminals without the server apparatus.

FIG. 12 illustrates an exemplary embodiment in which rules are created and executed between the terminals without the server apparatus 600. Referring to FIG. 12, a rule executing system may include the user terminal 1200 and the first user terminal 1300.

The user terminal 1200 may create the first rule stating that the user terminal 1200 performs the first action when the first condition is met in the first user terminal 1300. The user terminal 1200 may create the first rule by using the profile information stored in the user terminal 1200 including at least one of the information regarding the first user terminal 1300, the information regarding the first user, and the information regarding the conditions and the actions that can be performed in the first user terminal. Such information may be provided to the user terminal 1200 when the user and the first user join the rule executing service.

The user terminal 1200 may transmit the created first rule to the first user terminal 1300 and request the approving for the first rule. When an approving message of the first rule is received from the first user terminal 1300, the user terminal 1200 may execute the first rule. Specifically, when a first condition meeting message is received from the first user terminal 1300, the user terminal 1200 may execute the first rule by performing the first action.

Thus, the user terminal 1200 may be constituted to perform all the functions of the server apparatus 600 described above. Thus, the user terminal 1200 may receive the approving for the rules by directly transmitting the created rules to another user terminal, and execute the rules.

For example, the user terminal 1200 may create the second rule stating that the third user terminal performs the second action when the second condition is met in the second user terminal. The user terminal 1200 may request the approving by transmitting the second rule to the second user terminal and the third user terminal. When an approving message regarding the second rule is received from the second and the third user terminal, the second rule may be executed. Specifically, when a second condition meeting message is received from the second user terminal, the user terminal 1200 may transmit an event command to perform the second action to the third user terminal. Thereby, the third user terminal may perform the second action.

Further, the user terminal 1200 may create the third rule stating that the fourth user terminal performs the third action when the third condition is met in the user terminal 1200. The user terminal 1200 may request the approving for the third rule to the fourth user terminal, and execute the third rule when an approving message regarding the third rule is received from the fourth user terminal. Specifically, when the third condition is met, the user terminal 1200 may transmit an event command to perform the third action to the fourth user terminal. Therefore, the fourth user terminal may perform the third action.

The following will explain constitution of the user terminal 1200 by referring to the block diagram of FIG. 2 illustrating the constitution of the user terminal 100. Referring to FIG. 2, the user terminal 1200 may include the inputter 110, the display 120, the communicator 130 and the controller 140. Herein, constitution and operation of the inputter 110 and the display 120 are similar to those of the user terminal 100 explained in FIG. 2 while operation of the communicator 130 and the controller 140 is slightly different from that of the user terminal 100.

For example, differently from the user terminal 100 of FIG. 2, the communicator 130 of the user terminal 1200 may directly communicate with the user terminals included in the created rules without communicating with the server apparatus 600.

The communicator 130 of the user terminal 1200 may perform communication with the other external user terminals such as a first user terminal 1300 of FIG. 12 according to various types of the communication methods. Specifically, the communicator 130 may transmit the corresponding rules to another user terminals included in the rules by being controlled with the controller 140, request and receive the approving for the rules, and transmit an event command to perform the actions to the other user terminals.

For the above, the communicator 130 may connect to the other user terminals by wire or wirelessly, and communicate by using the various communication protocols such as Wi-Fi, P2P, Bluetooth, NFC, Universal Plug and Play (UPnP), Digital Living Network Alliance (DLNA), $3^{rd}$ Generation (3G), $3^{rd}$ Generation Partnership Project (3GPP), and Long Term Evolution (LTE).

Thus, the communicator 130 may be implemented to have various components that can connect to the other external user terminals and communicate using various communication protocols described above. The communicator 130 may include a LAN card, a Wi-Fi chip, a Bluetooth chip, an NFC chip, and wireless communication chip, although not limited thereto.

The controller 140 of the user terminal 1200 may be slightly different from that of the user terminal 100 by including functions of the server apparatus 600. Specifically, when creating the rules according to a user command, the controller 140 of the user terminal 1200 may directly receive the profile information from another user terminal joining the rule executing service and create the rules based on the information, instead of the receiving the profile information including the information regarding another user terminal, the information regarding another user, and the information regarding the conditions and the actions that can be met and performed in another user terminal from the server apparatus 600, and creating the rules based on the received information. At this process, a UI for creating rules may be generated based on the received profile information and the rules may be created through UI for creating rules.

Further, the controller 140 of the user terminal 1200 may store the information regarding the rules created by a user based on the profile information, the information regarding the conditions and the actions used in creating the rules, and the information regarding the record for executing the created rules on the storage. Further, the controller 140 may receive and store the information regarding the created rules by the other user terminals, and the information regarding the record for executing the rules from the other user terminals on the storage. Thereby, the controller 140 of the user terminal 1200 may automatically create and recommend the rules based on the stored information on the storage, as described above by referring to FIG. 2. However, since the user terminal 1200 may not use the server apparatus 600, the rules may not be created by selecting the rules automatically created and recommended by the server apparatus 600. As described above, the created rules by the user terminal 1200 based on the profile information and the automatically created rules may be transmitted and recommended to the other user terminals joining the rule executing service.

The controller 140 of the user terminal 1200 may not transmit the created rules to the server apparatus 600, and may directly execute the corresponding rules by transmitting the directly created rules to the other user terminals included in the corresponding rules, requesting and receiving the approving according to the necessity. Herein, the directly executing the corresponding rules indicates the receiving a condition meeting message directly or the transmitting an event command to perform the actions without passing through the server apparatus 600. For example, the process executing the first rule to the third rule is described above by referring to FIG. 12.

Figure 13:
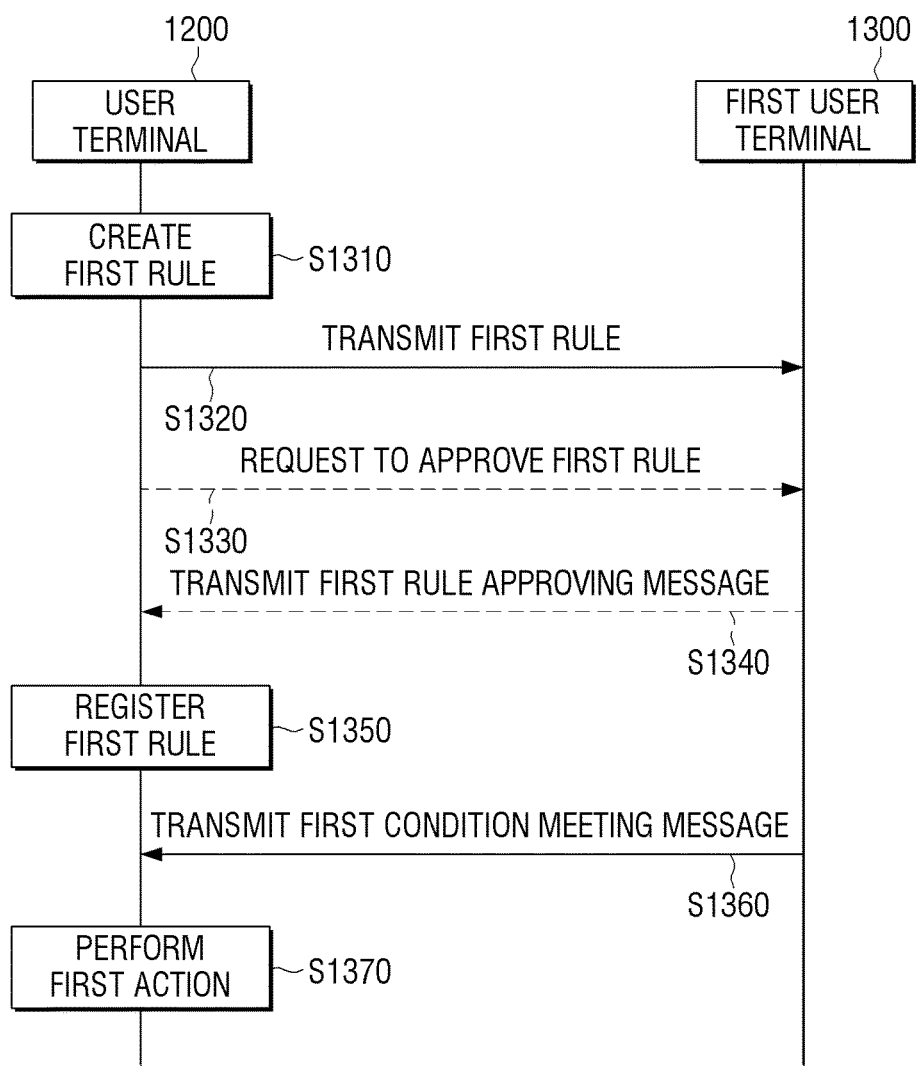
FIG. 13 is a flowchart illustrating a process of creating and executing the first rule between the terminals and without the server apparatus, according to an exemplary embodiment.

FIG. 13 is a flowchart explaining that the first rule is created and executed between the user terminals and without the server apparatus according to an exemplary embodiment. Referring to FIG. 13, the user terminal 1200 may create the first rule at S1310. Herein, the first rule indicates a rule stating that the user terminal 1200 performs the first action when the first condition is met in the first user terminal 1300. A user terminal 1200 may create the first rule based on the received profile information from the first user terminal 1300, as described above.

The user terminal 1200 may transmit the first rule to the first user terminal 1300 at S1320. The user terminal 1200 may request the approving for the first rule at S1330 and receive the transmission of an approving message of the first rule at S1340. As described above, the user terminal 1200 may be implemented to perform all the functions of the server apparatus 600. Thus, if the user terminal 1200 stores the approving for the first rule regarding the first user terminal in any format as described in FIG. 8, the process requesting and receiving the approving for the first rule may not be necessary.

Therefore, when the user terminal 1200 already stores the approving for the first rule regarding the first user terminal 1300, or when the first user terminal 1300 transmits an approving message regarding the first rule at S1340, the user terminal 1200 may register the first rule. Then, the user terminal 1200 may execute the first rule. Specifically, when the first user terminal 1300 transmits a first condition meeting message at S1360, the user terminal 1200 may receive the message and perform the first action according to the first rule at S1370.

In summary, the rule executing method according to an exemplary embodiment may be performed between the user terminals and without the server apparatus 600.

An exemplary embodiment includes an executing component including one or more conditions and one or more actions, and a rule that states that one or more actions are performed when one or more conditions are met between a plurality of the terminals or in one terminal. Therefore, the rules that can be created and executed through the user terminal 100, 1200 are not limited to the above described first rule to third rule.

For example, the user terminal 100, 1200 may create a fourth rule stating that when the fourth condition is met in the fifth user terminal (e.g., fifth other user terminal) different from the user terminal 100, 1200, the fifth user terminal performs the fourth action. Thus, although the fourth rule is created in the user terminal 100, 1200, the condition is met and the action is performed in the fifth user terminal different from the user terminal 100, 1200. For example, the user terminal may create a rule stating that when meeting the condition in which the mother's phone approaches 13:30, (i.e., 1:30 pm), September $15^{th}$, Text To Speech (TTS) action such as "Time to go to hospital" is performed. When the mother's phone approves the above rule, the mother's phone may display a sentence of "Time to go to hospital" and perform the alarm with the voice at 13:30 o'clock, September $15^{th}$.

According to one or more exemplary embodiments, when the user terminal 100, 1200 create the rules based on the profile information received from the server apparatus 600 or another user terminal, the profile information of the user terminal 100, 1200 may be used together.

Further, one or more exemplary embodiments describe a case in which one condition and one action are respectively selected when creating rules. However, the rules are not limited to this; the rules may be created and include a plurality of the conditions and the actions. Further, the rules may be created and executed with a plurality of the terminals meeting the condition or performing the action.

Thus, according to the above embodiments, the rules may be created and executed by stating that one or more actions are performed in one or more terminals when one or more conditions are met in one or more terminals. Therefore, the rules that can be created and executed between one or more terminals are not limited to those in the disclosure.

Furthermore, according to an exemplary embodiment, it may be implemented that when one or more conditions are met within one terminal, one or more actions may be performed within the terminal.

When describing the above by referring to the constitution of the user terminal 100 in FIG. 2, the controller 140 of the user terminal 100 may create the fifth rule stating that the user terminal 100 performs one or more specific actions when one or more specific conditions are met in the user terminal 100 according to the user command through the inputter 110. Therefore, the controller 140 may control the user terminal 100 to perform one or more specific actions when one or more specific conditions are met in the user terminal 100.

The fifth rule may be a rule stating that one or more actions are consecutively performed when one or more conditions are met in the user terminal 100. Thus, the controller 140 may control the user terminal 100 to consecutively perform one or more actions when one or more conditions are met in the user terminal 100.

For example, when the user terminal 100 is mobile laptop with a GPS function, a Wi-Fi function, and a Bluetooth function, a user may create the fifth rule including the three conditions and the three actions such that the mobile laptop is positioned near to a company (first condition), Wi-Fi access point is detected within a specific building of the company (second condition), the mobile laptop is positioned within a specific security area of the specific building (third condition), mobile server is contacted automatically (first action), mails are received (second action), and the company system intranet is contacted (third action). The mobile laptop according to an exemplary embodiment may execute the fifth rule.

However, the fifth rule is not limited to the above. For example, when one or more conditions are met in the user terminal 100, one or more actions may be simultaneously performed.

Although one or more exemplary embodiments describe a case in which the terminals are divided by a user, it is not limited to that. Because one user may use a plurality of the terminals, the rules may be created and executed on a terminal basis between a plurality of terminals.

According to one or more exemplary embodiments, a terminal user may create and execute various rules stating that specific action is performed when specific condition is met by combining one or more conditions and actions between a plurality of the user terminals in which the conditions that can be met and the actions that can be performed are different to each other, or in one terminal.

The rule executing method of the user terminal and the operation regarding the user terminals and the controller of the server apparatus may be implemented to be program codes which are stored and provided in a non-transitory computer readable recording medium. The user terminal and the server apparatus mounting such non-transitory computer readable recording medium may implement the program codes, and perform the rule executing method of the user terminal and the operation regarding the user terminal and the controller of the server apparatus according to one or more exemplary embodiments.

For example, non-transitory computer readable recording medium may store and provide the program codes for performing the rule executing method of the user terminal, which including the creating the first rule stating that the first action is performed by the user terminal when the first condition is met in the first user terminal according to a user command, the transmitting the created first rule to the external server, the receiving an event command to perform the first action from the external server when the first condition is met in the first user terminal, and performing the first action according to the event command.

Non-transitory computer readable recording medium may indicate medium which may store data semi-permanently and can be read by devices, not medium storing data temporarily such as register, cache, or memory. Specifically, the above various applications or programs may be stored and provided in a non-transitory computer readable recording medium such as CD, DVD, hard disk, Blu-ray disk, USB, memory card, or ROM.

Further, the foregoing exemplary embodiments and advantages are merely exemplary and are not to be construed as limiting the exemplary embodiments. The present disclosure can be readily applied to other types of apparatuses and methods. Also, the description of one or more exemplary embodiments is intended to be illustrative, and not to limit the scope of the claims.

What is claimed is:

1. A user terminal, comprising:
a display; and
a controller configured to:
provide a user interface (UI) for generating a rule including a condition executable in a first user terminal and an action executed in the user terminal based on the condition on the display, and
generate the rule according to a user command inputted through the UI,
wherein the UI includes a first UI for selecting the first user terminal, a second UI for setting the condition, and a third UI for setting the action executed based on the condition.

2. The user terminal of claim 1, wherein the controller is further configured to:
in response to the first user terminal being selected in the first UI, provide the second UI, and
in response to the condition being set in the second UI, provide the third UI.

3. The user terminal of claim 1, further comprising a communicator,
wherein the controller is further configured to:
control the communicator to transmit the generated rule to an external server, and
in response to a command based on the rule being received from the external server as the condition set in the second UI is executed in the first user terminal selected in the first UI and, execute the action set in the third UI according to the command.

4. The user terminal of claim 1, further comprising a communicator,
wherein the controller is further configured to provide the UI based on profile information of the first user terminal received from an external server through the communicator, and
wherein the profile information includes at least one from among information regarding the first user terminal and information regarding a condition executable in the first user terminal and an action executable in the user terminal.

5. The user terminal of claim 1, wherein the UI further comprises a fourth UI for selecting a second user terminal to execute the action, and
wherein in response to the condition set in the second UI being executed in the first user terminal selected in the first UI, the second user terminal selected in the fourth UI generates a rule for executing an action set in the third UI.

6. The user terminal of claim 5, wherein the controller is further configured to:
in response to the first user terminal being selected in the first UI, provide the second UI,
in response to the condition being set in the second UI, provide the third UI, and
in response to the action being set in the third UI, provide the fourth UI.

7. The user terminal of claim 1, wherein the controller is further configured to generate the rule by automatically applying a recommended item with respect to at least one from among the first UI, the second UI and the third UI.

8. A rule generating method of a user terminal, comprising:
displaying a UI for generating including a condition executable in a first user terminal and an action executed in the user terminal based on the condition; and
generating the rule according to a user command inputted through the UI,
wherein the UI includes a first UI for selecting the first user terminal, a second UI for setting the condition and a third UI for setting the action executed based on the condition.

9. The rule generating method of claim 8, wherein the displaying comprises, in response to the first user terminal being selected in the first UI, providing the second UI, and in response to the condition being set in the second UI, providing the third UI.

10. The rule generating method of claim 8, further comprising:
transmitting the generated rule to an external server; and
in response to a command based on the rule being received from the external server as the condition set in the second UI is executed in the first user terminal selected in the first UI, executing the action set in the third UI according to the command.

11. The rule generating method of claim 8, wherein the displaying comprises providing the UI based on profile information of the first user terminal received from an external server, and
wherein the profile information includes at least one from among information regarding the first user terminal and information regarding a condition executable in the user terminal and an action executable in the user terminal.

12. The rule generating method of claim 8, wherein the UI further comprises a fourth UI for selecting a second user terminal to execute the action, and
wherein in response to the condition set in the second UI being executed in the first user terminal selected in the first UI, the second user terminal selected in the fourth UI selects a rule for executing an action set in the third UI.

13. The rule generating method of claim 12, wherein the displaying comprises, in response to the first user terminal being selected in the first UI, providing the second UI, in response to the condition being set in the second UI, providing the third UI, and in response to the action being set in the third UI, provide the fourth UI.

14. The rule generating method of claim 8, wherein the generating comprises generating the rule by automatically applying a recommended item with respect to at least one from among the first UI, the second UI and the third UI.

* * * * *